United States Patent

Marra et al.

[11] Patent Number: 6,002,978
[45] Date of Patent: Dec. 14, 1999

[54] HOSLTER CONTROL OF A COMPUTER TRAIN BRAKE SYSTEM

[75] Inventors: Jon M. Marra, Henderson; Roger Lewis, Oggdensburgh, both of N.Y.

[73] Assignee: New York Air Brake Corporation, Watertown, N.Y.

[21] Appl. No.: 08/961,992

[22] Filed: Oct. 31, 1997

[51] Int. Cl.[6] .................................................. G06F 7/70
[52] U.S. Cl. ..................... 701/70; 701/71; 303/118.1; 303/124; 246/182 B
[58] Field of Search ..................... 701/70, 71; 303/3, 303/15, 20, 118.1, 124, 9.66, 86; 246/182 B

[56] References Cited

U.S. PATENT DOCUMENTS

| | | | |
|---|---|---|---|
| 5,172,316 | 12/1992 | Root et al. | 701/70 |
| 5,249,125 | 9/1993 | Root et al. | 701/70 |
| 5,369,587 | 11/1994 | Root et al. | 701/70 |
| 5,412,572 | 5/1995 | Root et al. | 701/70 |
| 5,590,042 | 12/1996 | Allen, Jr. et al. | 701/70 |
| 5,758,929 | 6/1998 | Newton et al. | 303/3 |

*Primary Examiner*—William A. Cuchlinski, Jr.
*Assistant Examiner*—Gertrude Arthur
*Attorney, Agent, or Firm*—Barnes & Thornburg

[57] ABSTRACT

The present hostler control of a computer control train brake system combines the computer control of the train and locomotive brake system with a manual control during a hostler mode to provide soft and safe operation of the vehicle. Interlocks provide efficient and safe transferring of the controls between the computer control brake system and the manual hostler control portion. The computer control train brake system includes an electropneumatic brake controller which automatically applies the independent brake once the hostler lead mode is determined. Next, the brake controller charges the brake pipe to release the train brakes. Control of the independent brake is transferred to a pneumatic independent brake control valve of the hostler stand after the brake pipe has been charged sufficiently to fully release the train brakes. The brake pipe is charged or the train brakes are released only after the independent brake application has reached a predetermined value. The computer controls the locomotive brakes in response to the pressure of the independent brake pipe and brake pipe. When the operator deactivates the hostler control, brake control is automatically transferred back to the computer control.

38 Claims, 7 Drawing Sheets

HOSLTER CONTROL OF A COMPUTER TRAIN BRAKE SYSTEM

BACKGROUND AND SUMMARY OF THE INVENTION

The present invention relates generally to computer controlled train brake systems and more specifically to a hostler control of a computer controlled train brake system.

Computer controlled train brake systems include electropneumatically controlled valves to control the train automatic brake system and the independent locomotive brake system. This is generally done by controlling the pressure in the train brake pipe and the locomotive independent application and release pipe. A typical example of such systems is the CCB and CCB II available from New York Air Brake Corporation, a Knorr-Bremse subsidiary of Watertown, N.Y. and as illustrated, for example, in U.S. Pat. No. 5,249,125.

Computer controlled train brake systems as well as pneumatically controlled train brake systems include a hostler stand which is a control stand located at the rear of the locomotive to provide the operator with the ability to control the locomotive throttle and independent brake for yard moves and train make-up. The presently available hostler stands have been completely manual or completely electronic in the control of the brake system, with the transfer to and from hostler control obtained by a manual set-up process only, i.e., cut-out cocks. Prior computer controlled train brake systems, when being switched into the trail mode, shut down or go into an idle mode, and relinquished control to the hostler stand. The hostler stand operates independently of the computer controlled brakes and manually-pneumatically operate the independent brake of the locomotive. The throttle is also independently controlled through the throttle control at the hostler stand.

The present hostler control of a computer control train brake system combines the computer control of the train and locomotive brake system with manual control during hostler mode to provide soft and safe operation of the vehicle. Electric and pneumatic interlocks provide efficient and safe transferring of the controls between the computer control brake system and the hostler control portion. The computer control train brake system includes an electropneumatic brake controller which automatically applies the independent brake once the hostler lead mode is determined. Next, the brake controller charges the brake pipe to release the train brakes. Control of the independent brake is transferred to a pneumatic independent brake control valve at the hostler stand after the brake pipe has been charged sufficiently to fully release the train brakes. The brake pipe is charged or the train brakes are released only after the independent brake application has reached a predetermined value. The independent brakes are applied by charging an independent pipe and providing pressure to the brake cylinder. Charging the brake pipe includes charging a reservoir, for example, an equalization reservoir of a brake pipe control valve, and charging the brake pipe using the brake pipe control valve. The brake pipe is charged only after the reservoir has reached a predetermined pressure. After the independent brakes are applied to a given value, the brake pipe is charged only upon receipt of a brake pipe charge command from the operator.

Applying the independent brakes and charging the brake pipes are not initiated if the train is moving or if an emergency brake is active. If emergency brake is active, or the mode is changed from the hostler trail mode or a penalty is received, the independent brake is applied, if not already applied, the brake pipe is discharged to apply the train brakes and subsequently the independent brake is released. The brake pipe is discharged first at a service rate and then at an emergency rate. For a hostler penalty state, a predetermined independent braking is set using the brake controller. Independent brake control is transferred back to the independent brake control valve upon removal of the hostler penalty state.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
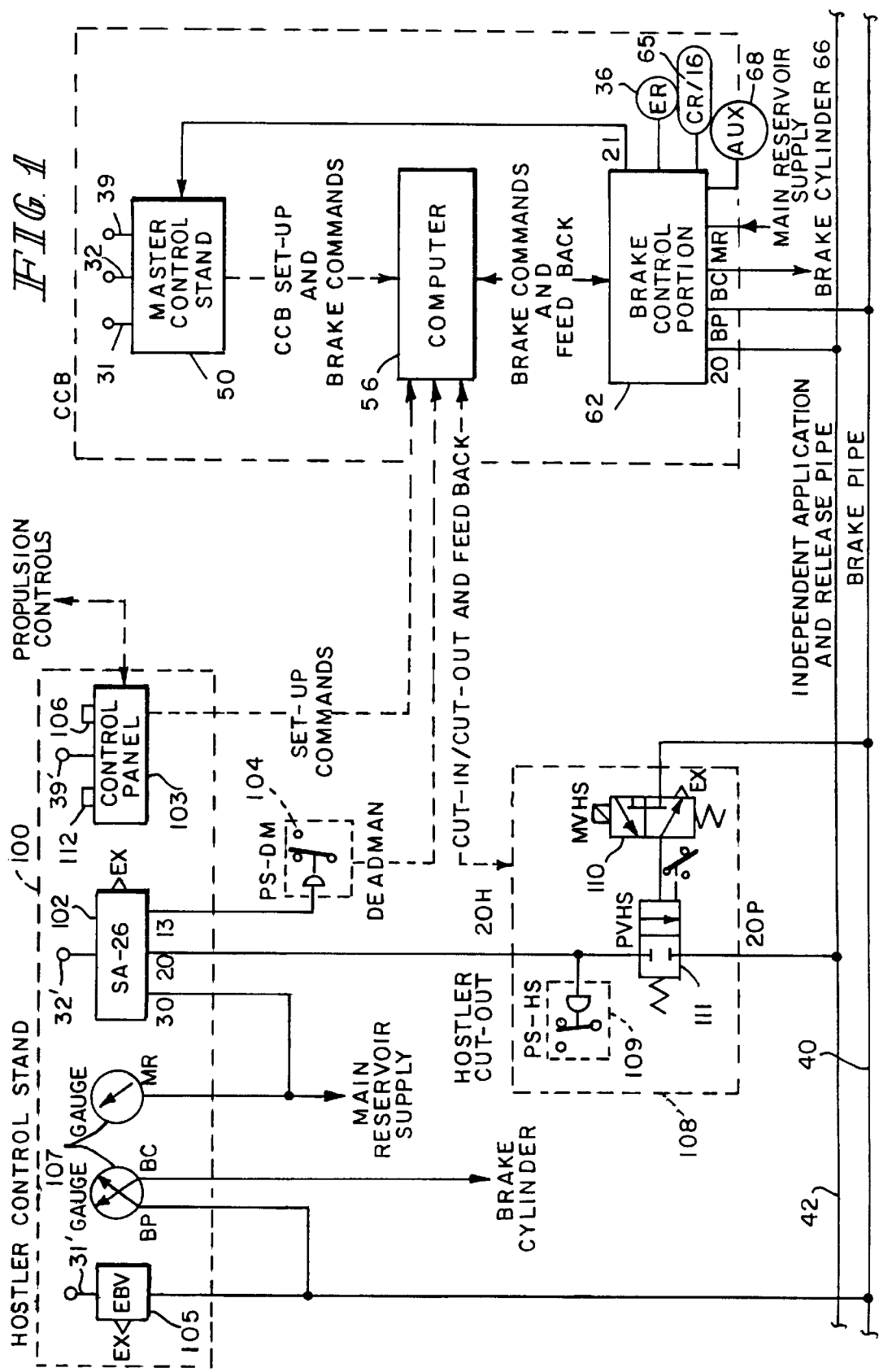
FIG. 1 is a block diagram of an electropneumatic train brake system or computer controlled train brake system with a hostler control according to the principles of the present invention.

A computer controlled train locomotive brake system with hostler control is shown in FIG. 1. The system is a CCB available from New York Air Brake Corporation and is described in U.S. Pat. No. 5,249,125 which is incorporated herein by reference. A master control stand 50 includes an automatic brake handle 31, an independent brake handle 32 and a throttle 39. A touch screen display is also provided to interface with the engineer or operator. The screen includes various information, one of which is a warning related to penalty brake pipe reduction. A microcomputer 56 receives inputs from the master control stand 50 and the touch screen display. Further inputs of the microcomputer 56 includes pressure signals from brake pipe 40, independent application and release pipe 42 and actuating pipe. Further, the microprocessor 56 includes penalty inputs and mode inputs. Additional pressure signals include the brake cylinder, control or 16 reservoir, equalization reservoir and emergency cut-off received from the brake control portion 62.

The brake control portion 62 is an electropneumatic system which receives equalization reservoir pressure, brake pipe cut-off valve, control or 16 reservoir pressure, independent pressure and actuating pressure signals from the microcomputer 56 and controls the values in the equalization reservoir 36, the control or 16 reservoir 65 and the auxiliary reservoir 68 to control the locomotive brake BC as well as the pressure on the various train pipes.

The system in FIG. 1 described so far is just an overview of a general computer controlled braking system in a locomotive in which the present invention is incorporated. The computer controlled train braking system can be used and is not considered to be the only system in which the present invention can be used. For example, the present system may be used on any microprocessor or computer controlled locomotive brake system, for example, the CCB II available from New York Air Brake Corporation.

Also, illustrated in FIG. 1, is a hostler control system which includes a hostler control station 100. The hostler control station is the operator's interface to the hostler controls. It includes a SA-26 independent brake control valve 102 with independent brake handle 32', hostler control panel 103 with throttle 39', lead/trail switch (rotary key switch) 112, and brake pipe charge switch (push-button) 106. Additional components of the hostler control station are emergency brake valve 105 and BP, BC and MR gauges 107.

The hostler control panel 103 is connected to the CCB computer 56 to provide the set-up commands for vehicle mode selection, zero speed status, and brake pipe charging. The independent brake control valve 102 is pneumatically connected to hostler deadman pressure switch (PS-DM) 104 to identify operator presence. The output of the independent brake control valve 102 is connected to independent application and release pipe 42 through the hostler cut-out valve 108. The hostler cut-out valve 108 provides the hostler control pneumatic interlock to the independent pipe 42. The independent brake control valve 102 also provides a pneumatic signal to the hostler deadman pressure switch 104. The PS-DM 104 electrically connects to the computer 56 and identifies the operator presence at the control stand.

The computer 56 is electrically connected to the brake control portion 62 for brake command and feed back status to control equalizing reservoir 36, brake pipe 40, independent application and release pipe 42, control or 16 reservoir 65, and brake cylinder 66.

The hostler cut-out valve 108 receives independent pressure from the independent brake control valve 102 and allows manual control of the independent pipe 42 when commanded by the computer 56. The hostler cut-out valve 108 is the electropneumatic interface between the hostler control station 100, the computer 56 and the independent pipe 42. The hostler cut-out valve 108 includes hostler electromagnet valve (MVHS) 110, hostler pilot operated cut-out valve (PVHS) 111, and hostler pressure switch PS-HS 109. The electromagnet valve (MVHS) 110 is connected electrically to the computer 56 to command the hostler pilot operated cut-out valve (PVHS) 111, using brake pipe pressure, to open (CUT-IN) or close (CUT-OUT) the path from the independent brake control valve 102 to the independent pipe 42. The hostler cut-out valve 108 also provides cut-in/cut-out status, as well, as confirmation of the presence of independent brake control valve output pressure to the computer 56 by pressure switch 109.

The hostler control stand 100 also includes an emergency brake valve 105 which is a high capacity pneumatic valve and provides the operator the means to initiate an emergency brake application by venting brake pipe 40 at a high rate of flow. Additionally, the hostler control stand 100 includes pressure gauges 107 to provide the operator system pressure status for main reservoir, brake pipe and brake cylinder.

Figure 2:
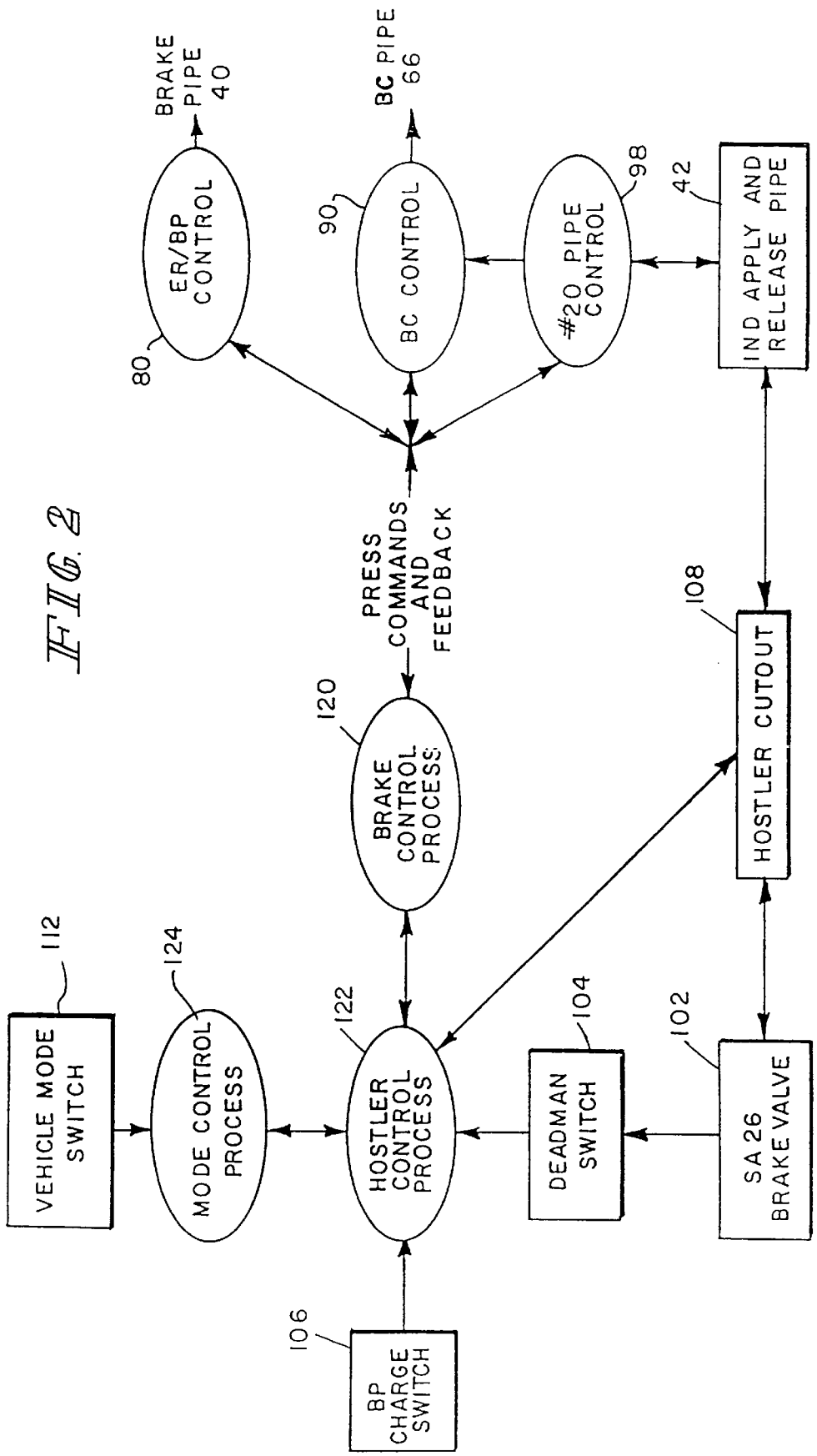
FIG. 2 is a flow chart of a computer controlled train brake control system incorporating hostler control according to the principles of the present invention.

Referring to FIG. 2, the vehicle mode switch 112 is used by the vehicle operator to indicate the operating state of the locomotive. The switch provides the means to select the hostler lead or trail modes. This electrical input is provided to the mode control process 124, which is a software routine in the microcomputer 56. The mode control process 124 is responsible for the overall operation of the locomotive braking system, as well as interaction between all of the locomotive systems that relate to braking and safety. The mode control process 124 determines the operating mode of the locomotive by reading the vehicle mode switch 112 and interpreting the conditions or states of the other braking subsystems. The mode control process 124 determines whether or not the vehicles are placed in the hostler enable mode as well as interpreting any ambiguous request from the vehicle's operator.

The results of the mode control process 124 is provided as one of the inputs to the hostler control process 122. The hostler control process 122 is a subsystem of the mode control process and is responsible for the normal operation while the vehicle is in the hostler lead mode, as well as interpreting the safety conditions of the vehicle while in control. The hostler control process 122 communicates the current operating condition/mode of the hostler control stand to the mode control process 124. The mode control process 124 uses information to allow or deny any request of vehicle mode changes during hostler lead mode or when the hostler stand is performing a normal shut-down sequence. The hostler control process 122 ensures that the vehicle is being operated safely by enforcing a maximum independent brake application ('hostler penalty') if the hostler deadman's switch 104 is not detected and, in the event of an emergency braking condition, allows orderly shut-down of the hostler stand 100. In the event of a detected failure of hostler controlled equipment or stand, the hostler control process 122 initiates an orderly shut-down of the hostler stand.

The brake control process 120 performs the brake control operation described in U.S. Pat. No. 5,249,125. The hostler control process controls the electromagnet hostler valve 110 to appropriately connect the pneumatic output of the independent brake control valve 102 to the independent application and release pipe 42 by PVHS valve 111. The brake control process provides electrical commands to the brake pipe circuit 80, the brake cylinder circuit 90 and the independent application and release pipe circuit 98 as well as the control circuit for the actuating pipe 43. The independent application and release pipe 42 is known in the industry as the #20 pipe and will be used therein as a short hand designation.

The hostler stand 100 is an auxiliary control stand located at the rear of the locomotive for providing the operating ability to control the locomotive throttle and the independent brake for yard moves and train makeup. The hostler brake control function is related to the microprocessor control of the independent and emergency brake and is used in conjunction with the manual control to provide safe operation of the vehicle in the hostler mode. The system incorporates electronic/software/pneumatic interlocks to provide transfer of vehicle control from the electronic controlled trail mode to the manually/pneumatically controlled hostler mode.

When the operator selects hostler lead mode, the hostler system will automatically accomplish the following:
 (1) apply independent brake;
 (2) charge equalization reservoir and brake pipe;
 (3) transfer control of the independent brake from the microcomputer 56 to the manual control of the independent brake control valve 102 of the hostler stand 100.

Additionally, when the operator de-selects the hostler lead mode, the system will automatically:

(1) apply the independent brake;
(2) discharge the equalization reservoir and brake pipe to zero causing full automatic brake application;
(3) release the independent brake to normal trail; and
(4) completely cycles to the trail mode.

Also, the hostler electronic control provides for hostler deadman, fault recovery or trainline emergencies.

Figure 3:
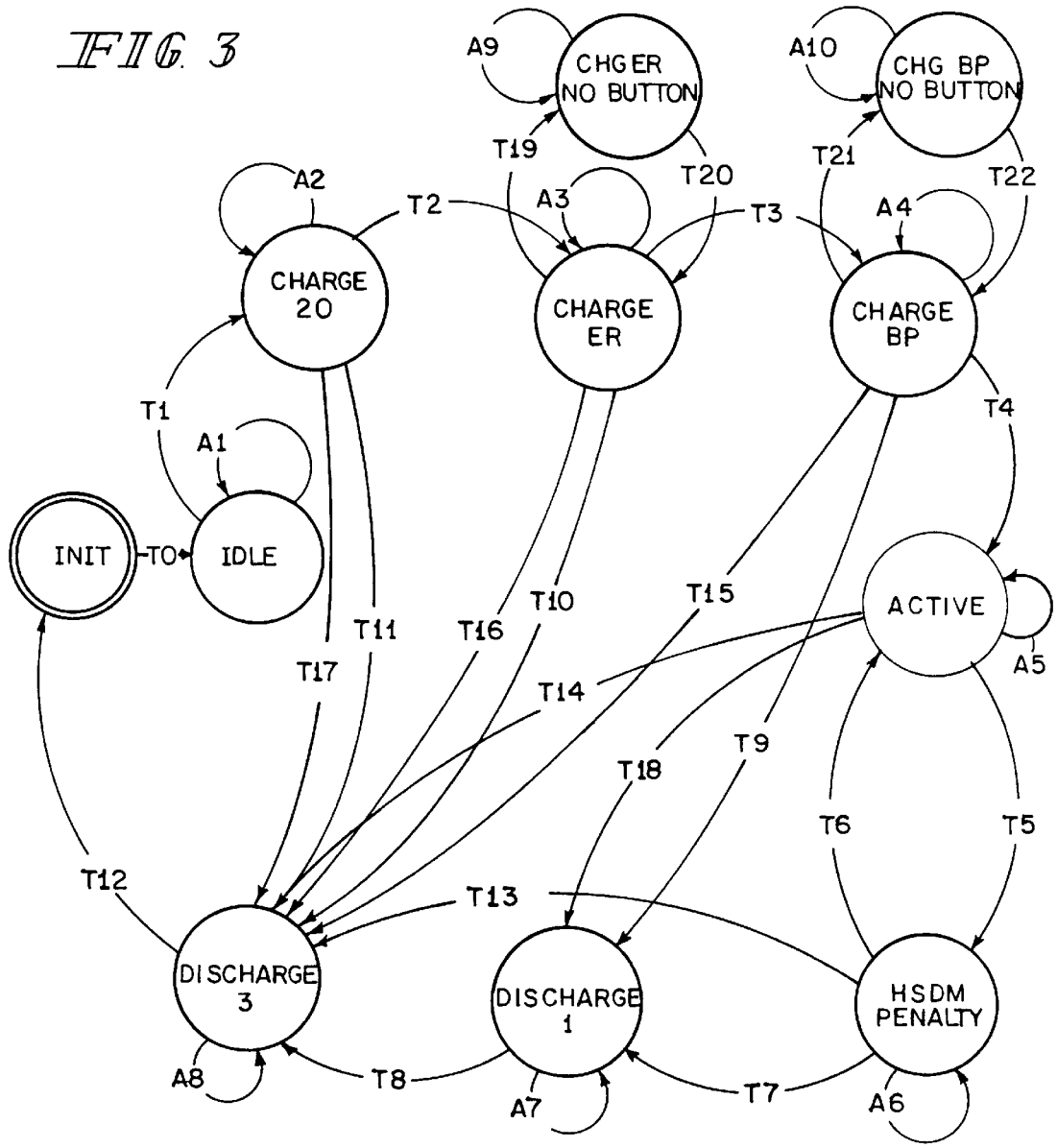
FIG. 3 is a dynamic model of a computer controlled train brake control system processing hostler control incorporating the principles of the present invention.

A dynamic model of the process performed by the hostler control process 122 and the brake control process 120 is illustrated in FIG. 3. The specific events, actions and states are described in detail in Table 1.

Figure 4:
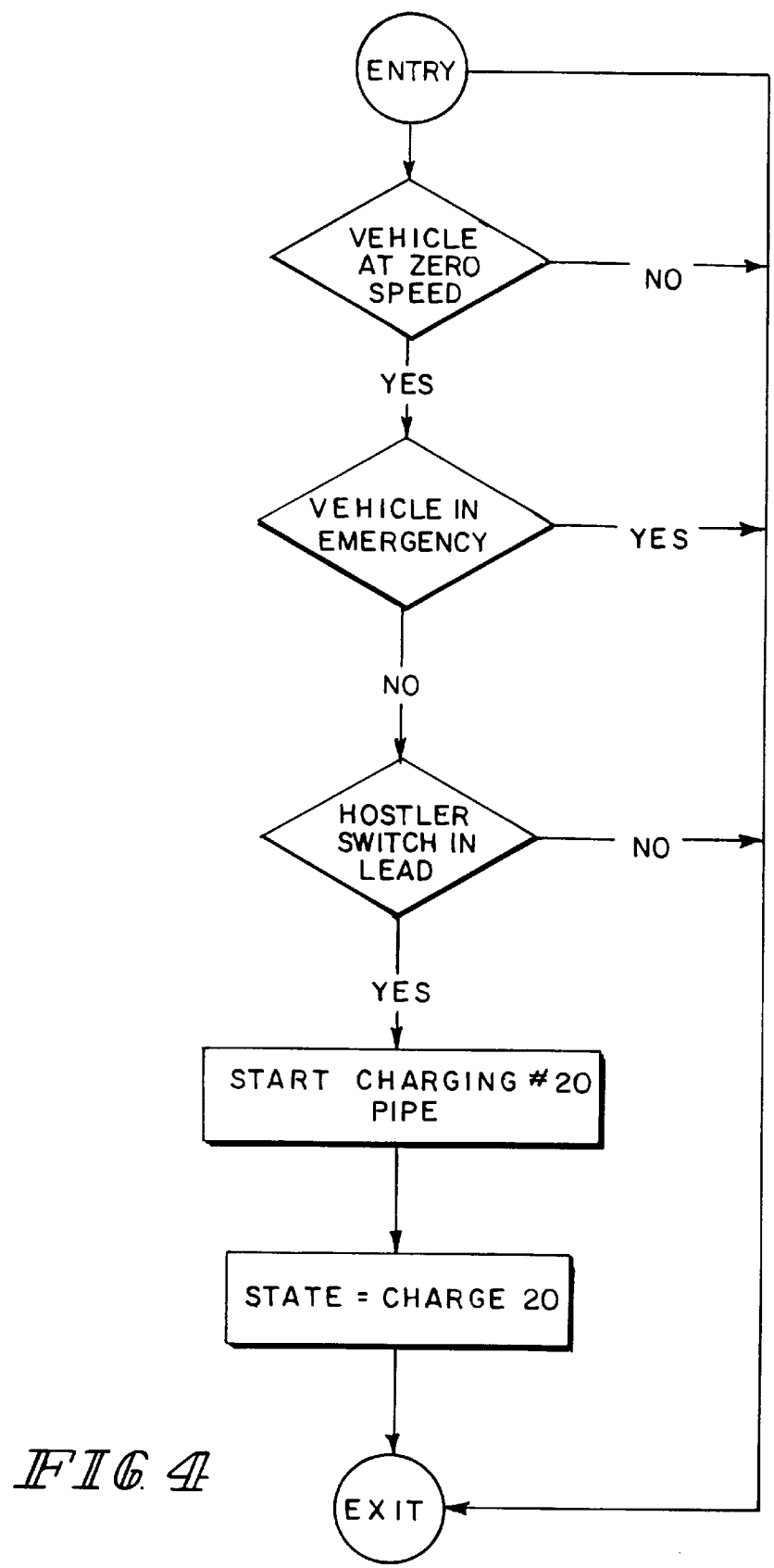
FIG. 4 is a flow chart of charging the #20 or independent brake pipe or applying the independent brake according to the principles of the present invention.

During the initialization state, the hostler control process 122 forces the MVHS valve 110 off and returns to the idle state. This state is typically only entered during hostler shut-down or a power-up. During the idle state, the hostler control process 122 waits for the operator to key in. If the operator keys in the hostler switch 112 to lead mode, and the vehicle is not in an emergency and the vehicle is at zero speed, the hostler control process 122 begins the charging of #20 or independent application and release pipe 42 via the brake control process 120 and enters the charge 20 state as illustrated in the flow chart of FIG. 4.

TABLE 1

| Transition | Input | Output | Old State | New State |
|---|---|---|---|---|
| T0 | Initialization complete | MVHS Off | Init | Idle |
| T1 | Hostler Switch on and Trial | Begin charging #20 | Idle | Charge ER |
| T2 | #20 pipe charged and PBBP depressed and detected | Begin charging ER | Charge 20 | Charge ER |
| T3 | ER>=BP | Cut in BP and continue charging ER/BP | Charge ER | Charge BP |
| T4 | BP>=110 | Set MVHS ON | Charge BP | Active |
| T5 | HSDM OFF and #20 pressure <90% | MVHS OFF, charge #20 | Active | Penalty |
| T6 | HSDM ON | MVHS ON, Lap #20 | Penalty | Active |
| T7 | HSL Switch OFF | | Active | Discharge 1 |
| T8 | ER and BP<35 PSI | Cut Out, turn off ER Rate control, MVHS OFF | Discharge 1 | Discharge 3 |
| T9 | BP not fully charged and HSL OFF | Force Emergency through MVEM for 30 seconds, MVHS OFF | Charge BP | Discharge 1 |
| T10 | BP not fully charged and HSL OFF | Force Emergency through MVEM for 30 seconds, MVHS OFF | Charge ER | Discharge 3 |
| T11 | #20 not fully charged and HSL OFF | Force Emergency through MVEN for 30 seconds, MVHS OFF | Charge 20 | Discharge 3 |
| T12 | #20 less than 5 PSI | Lap #20 | Discharge 3 | Init |
| T13 | Emergency Occurs | | Penalty | Discharge 3 |
| T14 | Emergency Occurs | | Active | Discharge 3 |
| T15 | Emergency Occurs | | Charge BP | Discharge 3 |
| T16 | Emergency Occurs | | Charge ER | Discharge 3 |
| T17 | Emergency Occurs | | Charge 20 | Discharge 3 |
| T18 | HSL Switch OFF | | Active | Discharge 1 |
| T19 | PBBP released and ER<BP | Set Modulate ER←Lap | Charge ER | Charge ER, No Button |
| T20 | PBBP depressed | | Charge ER, No Button | Charge ER |
| T21 | PBBP released and BP not fully charged | Set Modulate ER←Lap | Charge BP | Charge BP, No Button |
| T22 | PBBP depressed | | Charge BP, No Button | Charge BP |
| A0 | < > | < > | | |
| A1 | < > | < > | | |
| A2 | < > | Continue charging #20 | | |
| A3 | < > | Continue Charging ER | | |
| A4 | < > | Continue Charging ER/BP | | |
| A5 | < > | Normal Operation | | |
| A6 | < > | Force MVHS OFF, Charge #20 | | |
| A7 | < > | Discharge ER/BP to 0 | | |
| A8 | < > | Discharge #20 | | |
| A9 | < > | Lap ER | | |
| A10 | < > | Lap ER | | |

Figure 5:
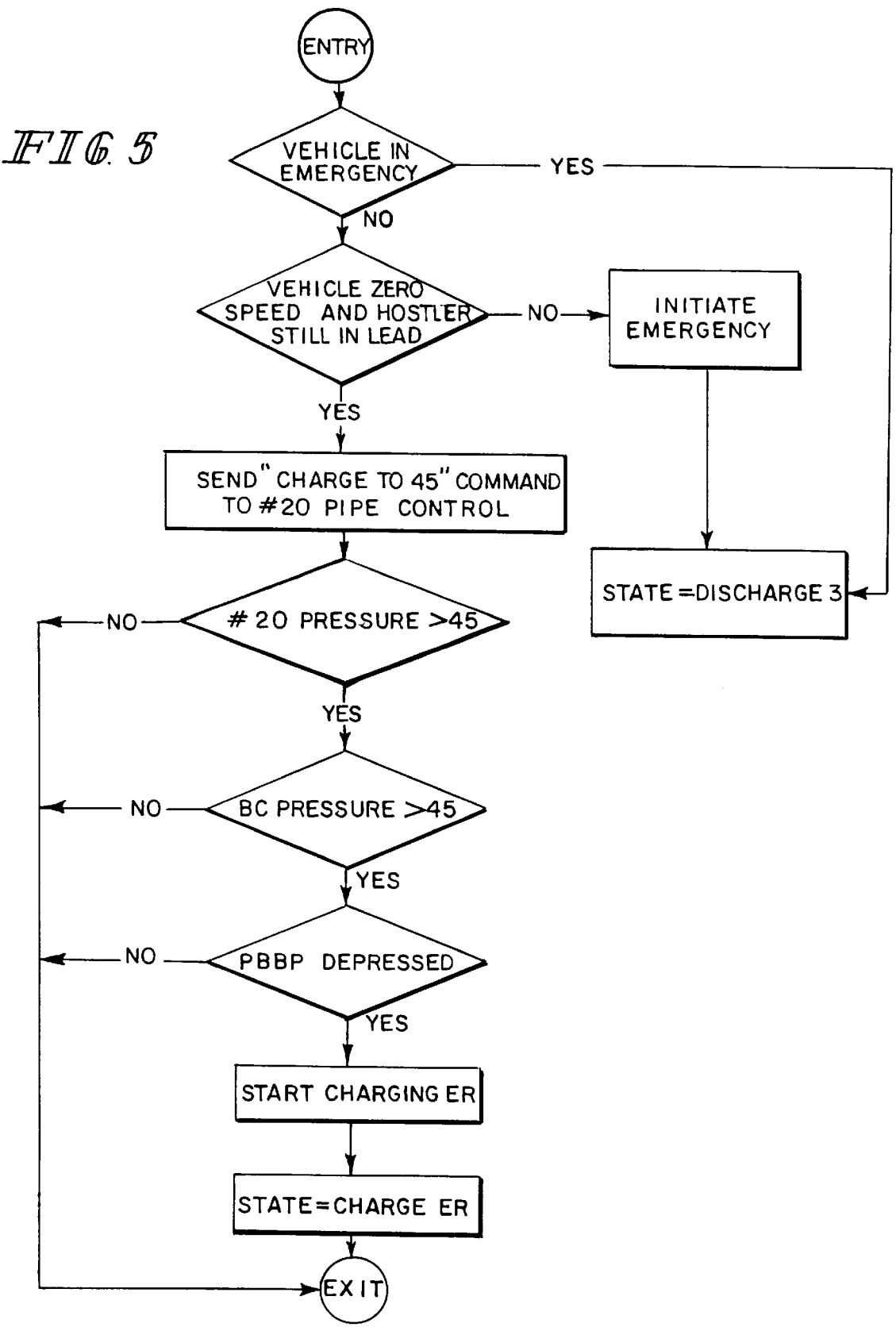
FIG. 5 is a flow chart for charging the equalization reservoir which controls the train brake pipe according to the principles of the present invention.

During the charge 20 state, the hostler control process 122 continues to charge the #20 pipe until the pressure reaches 45 PSI for example and the brake cylinder pressure reaches 45 PSI, for example. At this time if the brake pipe charge bush button 106 is detected, the brake control process 120 will begin charging the equalization reservoir via the brake control process 120 and enter the charge ER. This is illustrated in FIG. 5. If during the charge 20 state, the operator keys out of the hostler lead or a vehicle emergency occurs, the hostler control process 122 will terminate the process and begin an orderly shut-down of the stand by setting the state equal to Discharge 3. Also, on switching out of the hostler still in lead, or the vehicle speed should not be zero, it will initiate a train emergency condition before entering the Discharge 3 state.

The trainline emergency is initiated by the brake control process 120 upon receipt of an indication from the hostler control process 122 through the brake pipe control 80, using the electromagnetic valve MVEM (part of the base CCB system, located on brake control portion 62) of the system. This vents the brake pipe to propagate an emergency condition in the train brake pipe.

During the Discharge 3 state, the hostler control process 122 reduces the #20 pipe to 5 PSI, for example, via brake control process 120 to ensure proper operation of the trail mode push logic. When the #20 pipe pressure has been reduced, the hostler control process 122 will enter the initialization state once all internal variables have been properly re-initialized.

Figure 6:
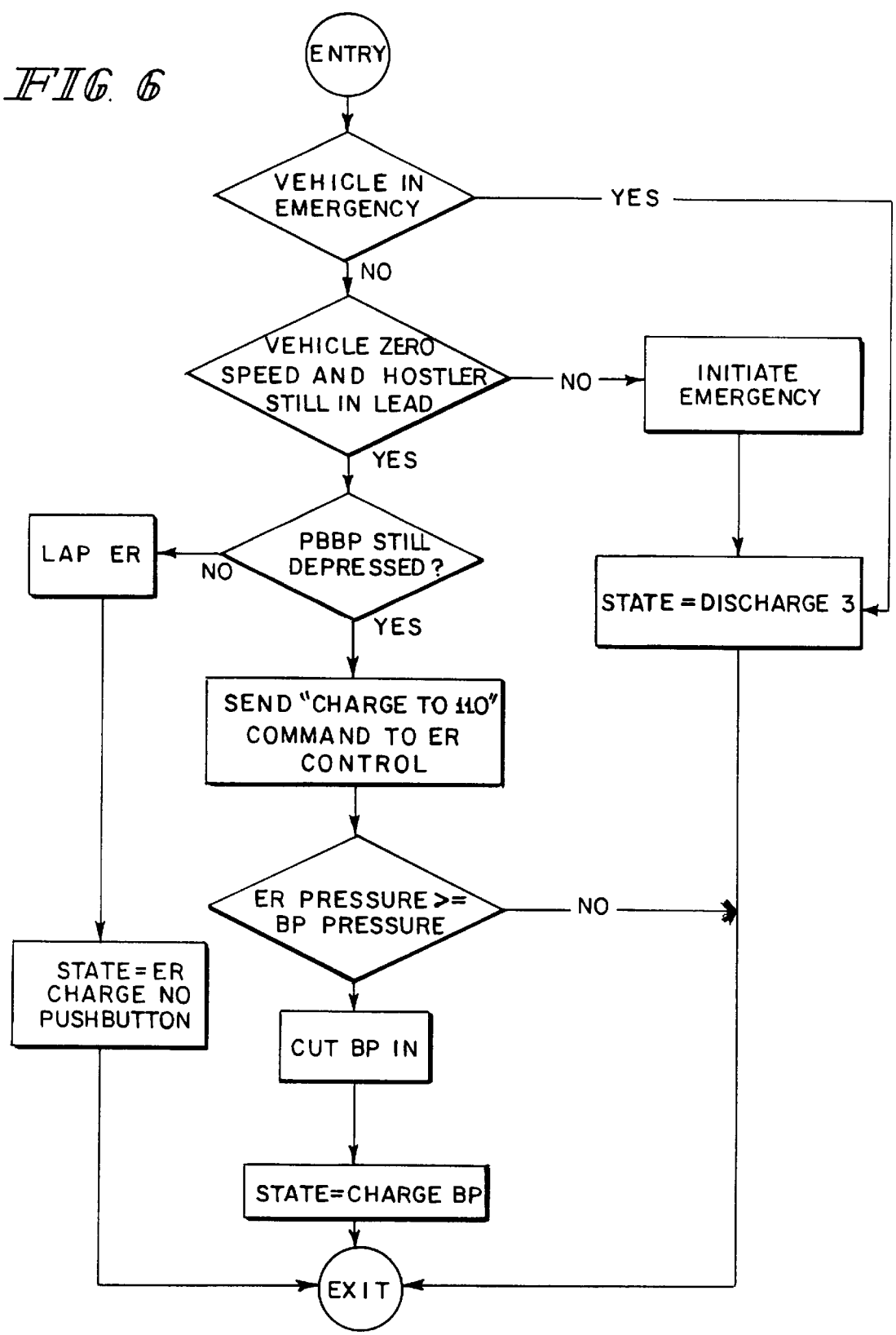
FIG. 6 is a flow chart of charging the equalization reservoir according to the principles of the present invention.

During the charge ER state, the hostler control 122 brings the equalization reservoir pressure up to brake pipe pressure to ensure a graceful cut-in. This is performed by sending a "charge to 110" command to the equalization reservoir control which is part of the brake pipe control circuit 80. When the equalization reservoir pressure reaches brake pipe pressure, and the operator still depressing the brake pipe charge switch 106, the hostler process 122 will cut in the brake pipe and enter the charge brake pipe state. This is illustrated in the flow chart of FIG. 6. If during the ER charge state the operator stops depressing the brake pipe charge switch 106, the equalization reservoir will lap at its current pressure and the hostler control process 122 will enter the charged ER no push button state.

As in the previous flow charts, if the vehicle is in an emergency during ER charging, the system will enter a Discharge 3 state or if the vehicle speed should not be zero or the hostler switches from the in-lead mode, an emergency will be initiated on the train brakes and the Discharge 3 state will be entered. Alternatively, if the hostler lead mode is still keyed in, the vehicle is not in an emergency braking condition and the vehicle speed is zero, reactivation of the brake pipe charge button will resume the charging of the equalization and reenter the charge ER state. The process will continue as in flow chart 6 until the system has re-entered the charge brake pipe state.

Figure 7:
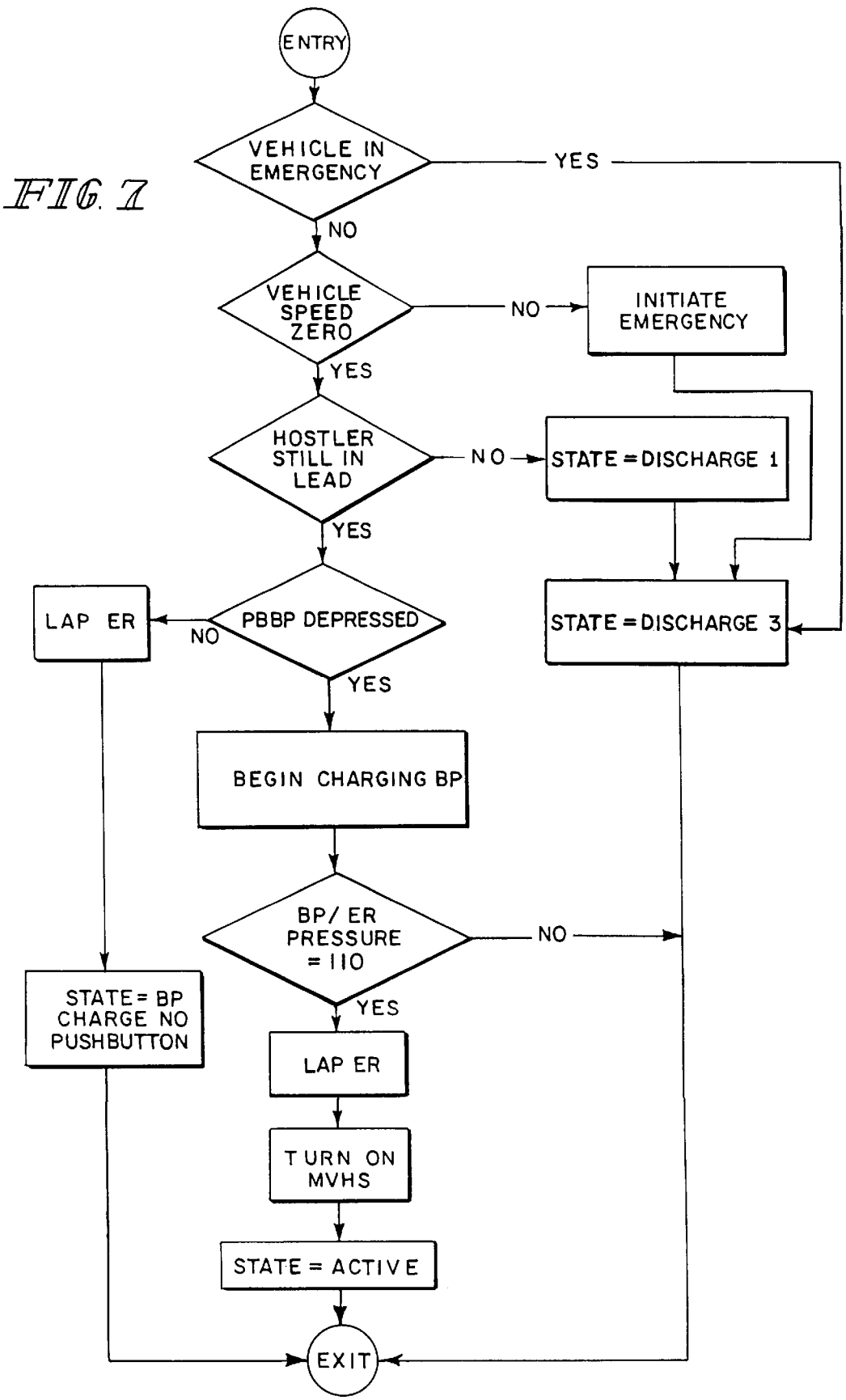
FIG. 7 is a flow chart of charging the brake pipe to release the train brakes according to the principles of the present invention.

Once the system has begun charging the equalization reservoir and executed a graceful cut-in of the brake pipe, the hostler control process 122 continues to charge the brake pipe to the 110 PSI target, for example. If during the charge BP state the operator stops depressing the brake pipe charge button 106, the hostler process 122 will lap the equalization reservoir valve and enter the charge brake pipe no push button state as illustrated in FIG. 7. If the button is maintained depressed and the equalization reservoir and brake pipe has been charged to 110 PSI and the deadman pressure switch indicates operator presence and speed less than 15 mph, the hostler process 122 will lap the equalization reservoir, turn on the MVHS magnetic valve 110 to allow operator control of the #20 pipe from the hostler stand 100 and enter the active state.

If the operator keys out of the hostler lead mode during the charge brake pipe state, the hostler process 122 will begin to enter the Discharge 1 state. This includes discharging the equalization reservoir and brake pipe towards zero at a normal service reduction rate. When the brake pipe pressure becomes less than, for example, 40 PSI, the trainline emergency will be invoked by the mode control process 124, activating the emergency magnetic valve and rapidly reducing the brake pipe pressure to zero. This will cause a full emergency application of the automatic or train brake system. When the equalization reservoir and brake pipe have been reduced below 40 PSI, the hostler control process 122 will reduce the #20 pipe in preparation for return to trail operation and will enter the Discharge 3 state.

As in the previous flow charts, if the vehicle is in an emergency condition during the charge brake pipe state, the Discharge state 3 is entered. Also, if the vehicle speed is not zero, an emergency is initiated and the state is set to Discharge 3.

In the active state, the operator has control of the #20 pipe through the independent brake control valve 102 and the hostler manifold 108. During this state, the condition of the hostler deadman switch 104 is monitored. If the signal goes low, the hostler control process 122 will command the MVHS 110 to deactivate, cutting-out pneumatic control and electronically commanding via the brake control portion 62, a 45 PSI charge of the #20 pipe to apply the independent brake and enter the hostler deadman penalty state. If the hostler deadman signal is again detected, indicating the operator has depressed the control handle, the MVHS magnetic valve 110 will be reactivated and control of the #20 pipe will be returned to the control valve 102. If the operator switches out of the hostler lead mode, either in the active state or in the hostler deadman penalty state, the hostler control process 122 will initiate a service reduction of the equalization reservoir and the brake pipe after the Discharge 1 state. If a vehicle emergency condition is detected in the active state or the hostler deadman penalty state, the hostler control process 122 will enter the Discharge 3 state.

The mode control process 124 offers a variety of interlocks in addition to not allowing any changes unless the vehicle speed is zero. When the vehicle is in the hostler mode, trail is the normal operating mode of the main cabin during the hostler operation. If the main cabin lead is selected, the mode change is ignored until the hostler stand becomes inactive.

When the locomotive current operating mode is trail, the following interlocks are in effect. If the hostler mode is selected, mode changes to hostler mode. If the lead-in or lead-out are selected and the hostler stand is still active, whether keyed in or shutting down, the mode change is ignored and the message is sent to the operator. If a lead-in or lead-out are selected and the hostler stand is inactive, the lead is selected.

When the locomotive is operating in the lead-in or lead-out mode, and the hostler mode is selected, this request is ignored. When the operating locomotive is in the lead-in or lead-out mode and trail is selected, trail is acknowledged.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A method of hostler control with a hostler controller of a computer controlled train brake system having an electropneumatic brake controller, the method comprising:
determining if the brake controller is in a hostler lead mode;
applying independent brake using the brake controller if in the hostler lead mode;
charging a brake pipe using the brake controller; and
controlling the independent brake using a pneumatic independent brake control valve of the hostler controller after charging of the brake pipe.

2. A method according to claim 1, wherein the brake pipe is charged only after the independent brake application has reached a predetermined value.

3. A method according to claim 2, wherein applying the independent brake includes charging an independent pipe and providing pressure to a brake cylinder; and the brake pipe is charged only after the independent pipe and brake cylinder have reached a predetermined pressure.

4. A method according to claim 2, wherein the independent brakes is controlled using the independent brake control valve only after the brake pipe has reached a predetermined value.

5. A method according to claim 1, wherein applying the independent brake includes charging an independent pipe.

6. A method according to claim 1, wherein the independent brake is controlled using the independent brake control valve only after the brake pipe has reached a predetermined value.

7. A method according to claim 1, wherein charging the brake pipe includes charging a reservoir of a brake pipe control valve of the brake controller and charging the brake pipe using the brake pipe control valve.

8. A method according to claim 7, wherein the brake pipe is charged only after the reservoir has reached a predetermined pressure.

9. A method according to claim 1, including determining receipt of a brake pipe charge command; and charging the brake pipe using the brake controller if the brake pipe charge command is received.

10. A method according to claim 1, wherein applying independent brake and charging the brake pipe are not initiated if the train is moving.

11. A method according to claim 10, wherein applying independent brake and charging the brake pipe are not initiated if emergency braking occurs.

12. A method according to claim 1, wherein applying independent brake and charging the brake pipe are not initiated if emergency braking occurs.

13. A method according to claim 1, including release of the independent brake, if applied, using the brake controller if one of the following conditions occur, an emergency brake or hostler lead mode is removed.

14. A method according to claim 1, including discharging the brake pipe, if charged or being charged, using the brake controller if one of the following conditions occur, an emergency brake or hostler lead mode is removed.

15. A method according to claim 14, wherein if one of the conditions occur, also apply the independent brake, if not applied, using the brake controller.

16. A method according to claim 15, including releasing the independent brake when the brake pipe is below a predetermined pressure.

17. A method according to claim 14, wherein said brake pipe is discharged at a service rate until a predetermined pressure and then discharged at an emergency rate.

18. A method according to claim 17, also releasing the independent brake, if applied, using the brake controller when the brake pipe is below the predetermined pressure.

19. A method according to claim 1, including determining a penalty state; and applying a predetermined independent braking using the brake controller if the penalty state is determined.

20. A method according to claim 19, wherein the independent brake is controlled using the independent brake control valve upon removal of the penalty state.

21. A method of hostler control using a hostler controller of a computer controlled train brake system having an electropneumatic brake controller, the method comprising:
applying independent brake using the brake controller if in a hostler lead mode;
releasing train brakes using the brake controller; and
controlling the independent brake using a pneumatic independent brake control valve of the hostler controller after releasing the train brakes.

22. A method according to claim 21, wherein the train brakes are released only after the independent brake application has reached a predetermined value.

23. A method according to claim 21, wherein if hostler lead mode is removed, applying the train brakes using the brake controller.

24. A method according to claim 23, wherein if hostler lead mode is removed, also apply the independent brake, if not applied, using the brake controller.

25. A method according to claim 24, including releasing the independent brake using the brake controller when the train brakes are applied above a predetermined pressure.

26. A method according to claim 21, wherein the train brakes are applied by the brake controller at a service rate until a predetermined pressure and then applied at an emergency rate.

27. A method according to claim 26, wherein also releasing the independent brake using the brake controller when the train brakes are above the predetermined pressure.

28. A method according to claim 21, including applying a predetermined independent braking using the brake controller for a penalty state.

29. A method according to claim 28, wherein the independent brake is controlled using the independent brake control valve upon removal of the penalty state.

30. A computer controlled train brake system including an electropneumatic brake controller for controlling train brakes and locomotive independent brake in response to signals from a main control stand, the system further comprising:
an independent brake control valve controlling the independent brake;
a hostler control stand pneumatically controlling the independent brake control valve; and
the brake controller, if in a hostler lead mode, applies independent brake, releases the train brakes, and transfers control of the independent brake to the hostler control stand after releasing the train brakes.

31. A system according to claim 30, wherein the brake controller regains control of the independent brake for occurrence of one or more of an emergency train braking, a penalty or switching out of the hostler lead mode.

32. A system according to claim 31, wherein when the brake controller regains control of the independent brake, the brake controller applies the train brakes.

33. A system according to claim 32, wherein when the brake controller regains control of the independent brake, the brake controller also applies the independent brake if not applied.

34. A system according to claim 33, wherein the independent brake is also releases when the train brakes are applied above a predetermined pressure.

35. A system according to claim 31, wherein the train brakes are applied at a service rate until a predetermined pressure and then applied at an emergency rate.

36. A system according to claim 35, also the brake controller releases the independent brake when the train brakes are above the predetermined pressure.

37. A system according to claim 31, wherein the brake controller applies a predetermined independent braking for a penalty state.

38. A system according to claim 30, including an electropneumatic valve connecting the independent control valve to the independent brake; and the brake controller operates the electropneumatic valve.

\* \* \* \* \*

UNITED STATES PATENT AND TRADEMARK OFFICE
CERTIFICATE OF CORRECTION

PATENT NO. : 6,002,978
DATED : December 14, 1999
INVENTOR(S) : Jon M. Marra and Roger Lewis It is certified that error appears in the above-indentified patent and that said Letters Patent is hereby corrected as shown below:

On the title page, item [54] and column 1, line 1:

Please correct the spelling of the word HOSLTER in the title to HOSTLER.

On the title page, item [75]:

The name of the city listed under the inventors is misspelled. The correct spelling of the city is "Ogdensburg."

Signed and Sealed this

Thirteenth Day of February, 2001

Attest:

NICHOLAS P. GODICI

Attesting Officer

Acting Director of the United States Patent and Trademark Office